United States Patent [19]

Ban et al.

[11] 4,024,582
[45] May 17, 1977

[54] TRACK CHANGE-OVER MECHANISM FOR A MULTI-CHANNEL TAPE

[75] Inventors: Itsuki Ban; Sumio Nozaki, both of Tokyo; Takanori Kasuya, Kodaira; Yukio Shinkado; Kanji Yano, both of Tokyo, all of Japan

[73] Assignee: Itsuki Ban, Tokyo, Japan

[22] Filed: Aug. 18, 1975

[21] Appl. No.: 605,406

[30] Foreign Application Priority Data

Dec. 27, 1974  Japan ............................ 49-148788

[52] U.S. Cl. ............................................... 360/106
[51] Int. Cl.² ...................... G11B 5/55; G11B 21/08
[58] Field of Search .............................. 360/106, 78

[56] References Cited

UNITED STATES PATENTS

| | | | |
|---|---|---|---|
| 3,628,796 | 12/1971 | Ban | 360/106 |
| 3,649,030 | 3/1972 | Ban | 360/106 |
| 3,663,022 | 5/1972 | Ban | 360/106 |
| 3,781,018 | 12/1973 | Cayton | 360/106 |
| 3,921,216 | 11/1975 | Wada | 360/106 |

*Primary Examiner*—Robert S. Tupper
*Attorney, Agent, or Firm*—George B. Oujevolk

[57] ABSTRACT

A track change-over mechanism for shifting a magnetic head of a multi-channel tape recorder and comprising a cam follower for moving the magnetic head and bearing upon a stepped cam angularly displaceable with an idler wheel carried on a pivoted lever which rocks to a driving position in which the idler wheel is in driving contact with capstan means for rotating the idler and the stepped cam, an electromagnetic device for directly or indirectly actuating rocking of the pivoted lever and means including a second cam for disengaging the idler wheel drive when the stepped cam has shifted the stepped cam-follower, and thereby the magnetic head, by one step.

10 Claims, 11 Drawing Figures

TRACK CHANGE-OVER MECHANISM FOR A MULTI-CHANNEL TAPE

This invention relates to a track change-over mechanism for a multi-channel tape recorder, and more particularly to apparatus for shifting a magnetic head to change from one tape track to another.

In one type of conventional change-over mechanism, the magnetic head is shifted by a large plunger or ratchet. Another type of conventional mechanism uses an electromagnetic mechanism having a rotatable claw which abuts against one of a plurality of projections on a rotating fly-wheel and is moved by the fly-wheel, and a step pulley rotated in response to movement of the claw thereby to shift the magnetic head vertically. The former mechanism is not suitable for domestic tape recorders since it consumes a large amount of electric power and produces an unpleasant knocking sound. The latter mechanism, which utilizes the moment of inertia of the fly-wheel as the principal driving power, is sometimes erroneous in operation and also produces a knocking sound.

One object of the invention is to provide changeover mechanism which has higher reliability, requires less electric power and is less noisy.

Another object of the invention is to provide a mechanism for shifting a magnetic head in a multi-channel tape recorder which has fewer working parts and is susceptible to mass-production.

According to this invention a track change-over mechanism for shifting a magnetic head of a multi-channel tape recorder, comprises a cam follower for moving the magnetic head and bearing upon a stepped cam angularly displaceable with an idler wheel carried on a pivoted lever which rocks to a driving position in which the idler wheel is in driving contact with capstan means for rotating the idler and the stepped cam, an electromagnetic device for directly or indirectly actuating rocking of the pivoted lever and means including a second cam for disengaging the idler wheel drive when the stepped cam has shifted the stepped cam follower, and thereby the magnetic head, by one step.

The lever may be biased either toward or away from the driving position. In the former case, the lever is restrained in an initial position by a pivoted actuator arm which is moved by the electromagnetic device to permit rocking of the lever, and the second cam comprises portions of the idler wheel periphery which contact the capstan and which correspond to the steps of the stepping cam, the second cam being shaped so as to return the lever to the initial position where it is once again restrained by the actuator arm.

When the bias is away from the driving position, the actuator acts as a follower for the second cam which has notches around its periphery at intervals corresponding to the steps of the stepped cam. The actuator is moved by the electromagnetic device so as to push the lever to the driving position. As the cam turns, the arm leaves the notch but its reverse movement is limited so that the driving position is maintained until the next notch is encountered.

Embodiments of the invention will now be described by way of example with reference to the accompanying drawings, of which:

FIG. 1 is a schematic side view of a first embodiment of a track change-over mechanism;

FIGS. 2 and 3 respectively are a plan view and a side view of the mechanism of FIG. 1;

FIG. 4 is a graph showing the variation of the radius of a quadrilateral idler used in the mechanism of FIGS. 1 and 3;

FIGS. 5 and 6 respectively are a plan view and a side view of a second embodiment of mechanism according to this invention;

Figure 9:
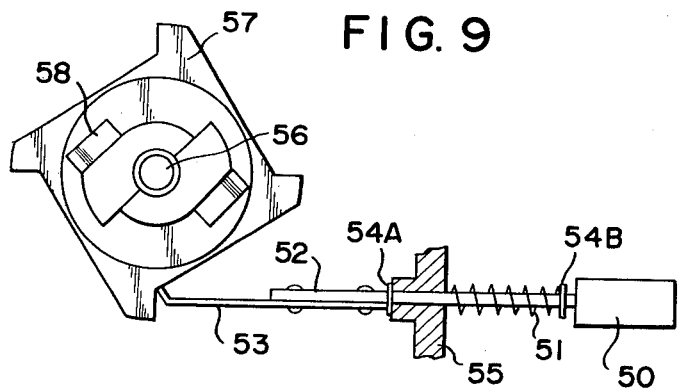
Figure 10:
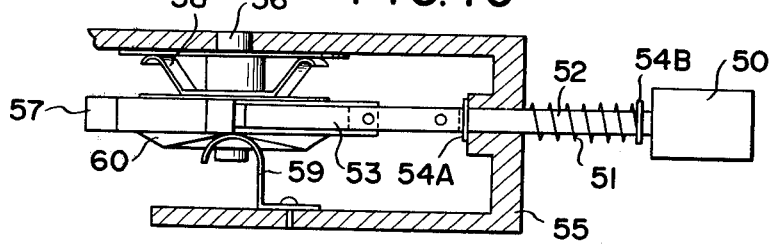
Figure 11:
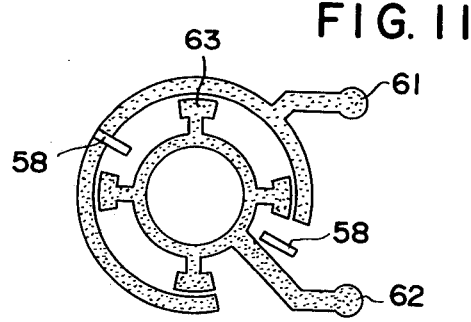

FIGS. 9 and 10 respectively are a plan view and a side view of a push button switch; and FIG. 11 shows a conductor pattern used in the switch of FIGS. 9 and 10.

Figure 1:
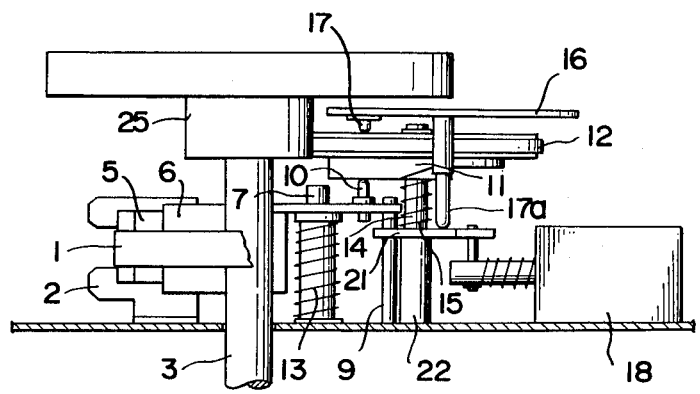
Figure 2:
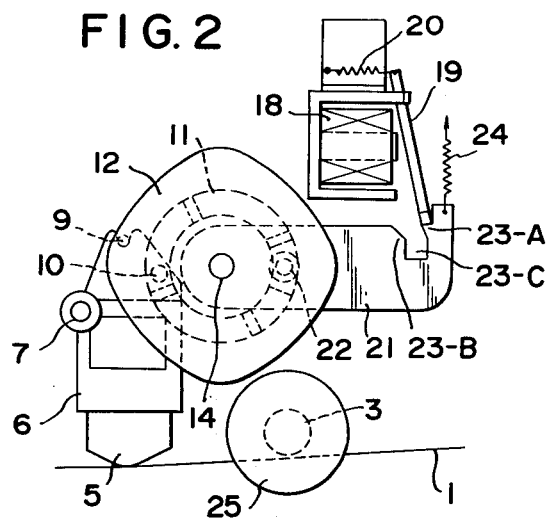
Figure 3:
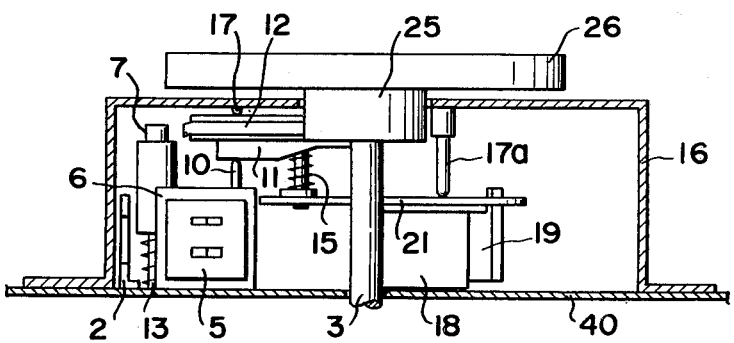

Referring to FIGS. 1 to 3, a magnetic tape 1 runs through a tape guide 2, and passes a capstan 3 and a pinch roller (not shown) which drive the tape past a magnetic head 5. A support 6 for the head 5 is carried by a rod 7 (see FIG. 2) which is slidable in a vertical direction. A guide pin 9 prevents rotation of the head support 6 and a pin or follower 10 is pressed against a rotating or step cam 11, for vertically shifting the magnetic head 5 and its support 6, by means of a compression spring 13 around the support rod 7. The step cam 11 is fixed to and coaxial with an idler 12 which is rotatably supported by a rod 14 and, together with the idler 12, is biased upwardly by a compression spring 15 around the support rod 14 so that the cam maintains its correct position without deviation from its standard elevation and without tilt due to external mechanical force during operation, to avoid an irregular track change. Above a slide plane opposite stepped surface of cam 11, there is an abutment or pin 17 mounted on the wall of a body or housing 16 enclosing the magnetic head shifting mechanism. The pin 17 serves to prevent tilting or swaying of the step cam 11 under pressure of the follower 10, and is so located as to effectively oppose the pressure of the follower 10, which is, for example, located on a line parallel to the axis of the support rod 14 and containing the follower 10.

For the purpose of mass production, the bearing between the idler and the support rod 14 must be tapered at a certain minimum single. Therefore, any effort to reduce tilting of the idler 12 on the support rod 14 by increasing the length of the bearing portion is ineffective because the taper or the clearance between the bearing portion and the support rod cannot be eliminated. Accordingly, the pin 17 above the idler is necessary to prevent tilting of the step cam 11, and to reduce undesirable mechanical forces applied to both the support rod 14 and the idler bearing on the rod 14. While, in FIG. 1, the pin 17 contacts the upper surface of the idler 12 and opposes the step cam 11, a pin 17a may optionally be mounted on the body or housing 16 so as to abut against a lever 21 as illustrated in FIG. 3. The idler 12 is fixed to the step cam 11 and driven by capstan means including the capstan 3 itself and a drive wheel 25 fixed to the capstan 3. In the embodiment of FIGS. 1 to 3, the idler is pressed against the drive wheel 25 and is driven by the wheel 25 as the capstan 3 rotates. Alternatively, the idler 12 may be pressed against and rotated directly by the capstan 3. As idler 12 rotates and with it the step cam 11, the magnetic head 5 is shifted in steps by the follower 10, and a predetermined channel can be selected with certainty.

A solenoid-operated electromagnet 18 is secured to a body or chassis 40 and attracts an actuator 19, one end of which is pivoted on the electromagnet 18. The actuator 19 is biased away from the electromagnet 18 by a spring 20. A lever 21, pivoted at its central point by a rod 22 mounted on the body or chassis 40, carries at its free end the rod 14 on which the idler 12 is rotatably supported. Equally angularly spaced around the step cam 11 are "4" steps of different elevations, there being four tracks on the magnetic tape to be used. In general, when there are $n$ tracks, the cam 11 has $n$ steps of different elevations and arranged symmetrically with respect to its axis. The idler 12 has a generally polygonal periphery having $n$ sides, i.e. the number of sides is equal to the number of steps of the step cam 11. In FIG. 2, for example, the idler 12, which serves as a cam, has its four sides arranged symmetrically with respect to its axis. On the other end of the lever 21 (on the right end in FIG. 2), there is a stepped portion 23-A for engagement with the actuator 19, a chamfered portion 23-B for a temporary engagement with the actuator 19, and a relieved portion 23-C between the portions 23-A and 23-B. At this end of the lever 21 is a spring 24 biasing the lever 21 such that the idler 12 is pushed toward a drive wheel 25. The peripheries of the drive wheel 25 and the idler 12 are covered with a material such as rubber to improve the frictional drive therebetween. The drive wheel 25 is coaxial with and connected to a fly-wheel 26.

In operation, when the electromagnet 18 is inoperative, the actuator 19 is separated from the electromagnet 18 by the spring 20, and the lever 21 engages the step-shaped portion 23-A to separate the idler 12 and the drive wheel 25.

Figure 4:
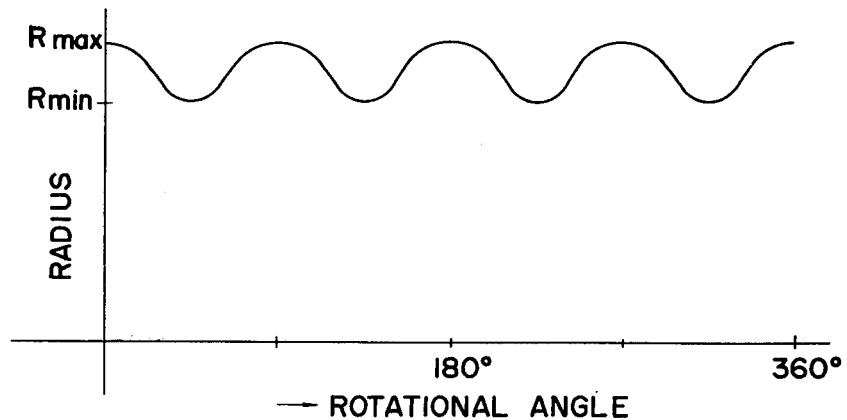

When the electromagnet 18 is energized, the actuator 19 is attracted toward the electromagnet 18 against the bias of spring 20 and disengages from the stepped portion 23-A. The actuator 19 then engages the slanting portion 23-B to prevent the further displacement of the lever 21 under the action of spring 24, thereby preventing contact between the idler 12 and the drive wheel 25. When the electromagnet 18 is then de-energised, the actuator 19 disengages from the slanting portion 23-B and enters the relieved portion 23-C, so that the idler 12, for the first time, comes into contact with the periphery of the drive wheel 25. Since the idler 12 is not circular, its angular displacement, when driven, follows the smooth durve shown in FIG. 4. When the end of the actuator 19 is in the relieved portion 23-C, the lever 21 makes a see-saw pivotal movement about the rod 22. When the centre distance of the drive wheel 25 and the idler 12 has a maximum value, the actuator 19 leaves the relieved portion 23-C and engages the stepped portion 23-A to prevent further displacement of the lever 21. For each energisation cycle of the electromagnet 18, the idler 12 repeats the above described motion, the step cam 11 being angularly displaced through 90° to vertically shift the magnetic head 5 by one step, and change over from one track to an adjacent track of the magnetic tape.

Because of the capstan and fly-wheel, the driving motor (not shown) operates at a lower speed and higher torque than would otherwise be necessary. Consequently, the apparatus is more positive and reliable in operation and is susceptible to mass production having fewer parts and being of simpler construction. Since the shift of the magnetic head or the change over from one track to another is carried out only when the electromagnet 18 has been energised and then de-energised, one track change is performed positively upon receipt of one signal regardless of the push-button closing period or the length of the sensing conductor. Further, since the energy required for the operation is supplied by rotation of the drive wheel 25, the operation is smooth, no knocking sound being produced, and does not rely on the inertia of the fly-wheel and hence an increased moment of inertia is only required for limiting the wow/flutter of the tape drive.

Figure 5:
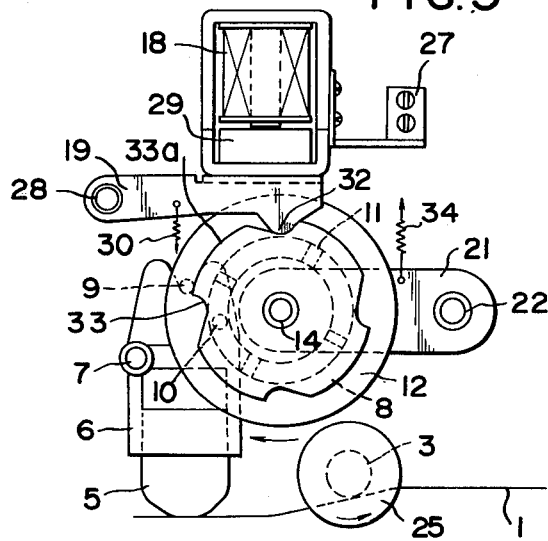
Figure 6:
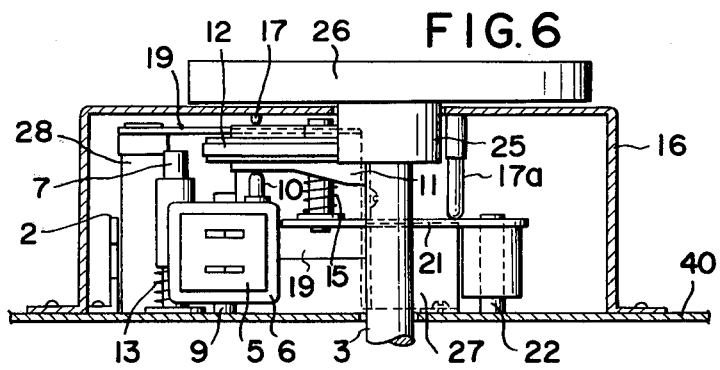

In the embodiment of FIGS. 5 and 6, an electromagnet 18 is mounted to a chassis 40 by a resilient member 27, the actuator 19 being pivoted on a rod 28 mounted on the chassis 40. The actuator 19 is biased toward the electromagnet by a permanent magnet 29 and closes the open ends of the magnetic path in the U-shaped magnetic core of the electromagnet 18 and is also biased by a spring 30 away from the electromagnet 18. The lever 21 is pivoted, at its right hand end, upon a rod 22 mounted on the chassis 40 and carries a rod 14 on which the step cam 11, the idler 12, and a notched cam 8, are mounted for pivotal movement together. The lever 21 is biased by a spring 34 so as to urge the idler 12 away from a drive wheel 25.

When the electromagnet 18 is inoperative, a projection 32 on the free end of the actuator 19 engages with a notch 33 on the periphery of the notch cam 8 and the permanent magnet 29 is attracted to the electromagnet 18, to keep the idler 12 away from the drive wheel 25. When the electromagnet 18 is energized by an electrical pulse, the permanent magnet 29 parts from the electromagnet 18, partly because the poles of the magnets are arranged to produce a repulsive force and partly because of the spring 30, so that the magnet 29 is held away from the electromagnet 18 even though the gap between the two magnets is small, and the idler 12 is pressed against the drive wheel 25. A small angular displacement of the idler 12 causes the projection 32 of the actuator 19 to leave the notch or depression 33 of the notch cam 8 and engage with the periphery 33a. The actuator 19 presses the idler 12 against the drive wheel 25, the force being provided by the reaction of the elastic member 27. That is to say, the elastic member 27 also acts to restrain the actuator 19 and maintain the idler 12 in contact with the drive wheel 25. Accordingly, there is a positive drive between the drive wheel 25 and the idler 12. When the projection 32 engages the next notch of the cam 8, the lever 21 is pivoted clockwise by the spring 34, and the idler 12 automatically parts from the drive wheel 25 and does not rotate until the electromagnet 18 is energised once again. Each time the electromagnet 18 is energised, the notch cam 8 is displaced through 90°, and the magnetic head 5 is vertically shifted by one step to effect the change over from one track of the magnetic tape to another.

Figure 7:
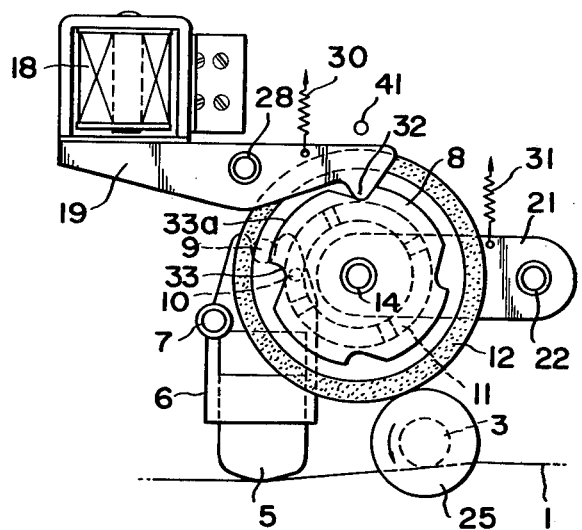
FIG. 7 is a plan view of a third embodiment of mechanism according to the invention.

Referring to FIG. 7, the electromagnet 18 is secured to the chassis and the actuator 19 is of a small-remanence material such as soft iron, and is pivoted upon a rod 28 mounted on the chassis. When the electromagnet 18 is inoperative, the actuator 19 is held away from the electromagnet 18 by the spring 30. A stop 41 is provided to limit movement of the actuator 19 to a small angle both to reduce electric power consumption and to bring the idler 12 into contact with the drive wheel 25 when a projection 32 at the free end of the actuator 19 engages with the periphery 33a of the notch cam 8, in a manner similar to that described above in connection with FIG. 5.

The location of the stop 41 is, therefore, so determined that both the contact of the drive wheel 25 with the idler 12 and the contact of the periphery 33a of the notch cam 8 with the projection 32, can take place simultaneously.

When the electromagnet 18 is inoperative, the projection 32 at the free end of the actuator 19 is held apart from the notch 33 in the notch cam 8 by the spring 30. When the electromagnet 18 is momentarily energised upon receipt of a d.c. pulse, the actuator 19 is displaced clockwise against the biasing force of the spring 30, and the projection 32 on the end of the actuator 19 engages with the notch 33 and the idler 12 comes into contact with the drive wheel 25. Rotation of the idler then brings the projection 32 into engagement with the notch cam periphery 33a, and the free end of the actuator 19 abuts the stop 41 and presses the idler 12 against the drive wheel 25. When the projection 32 enters the next notch of the cam 8, the lever 21 is displaced clockwise by the spring 31, and the idler 12 automatically separates from the drive wheel 25 which does not rotate further until the electromagnet 18 is once again energised.

Figure 8:
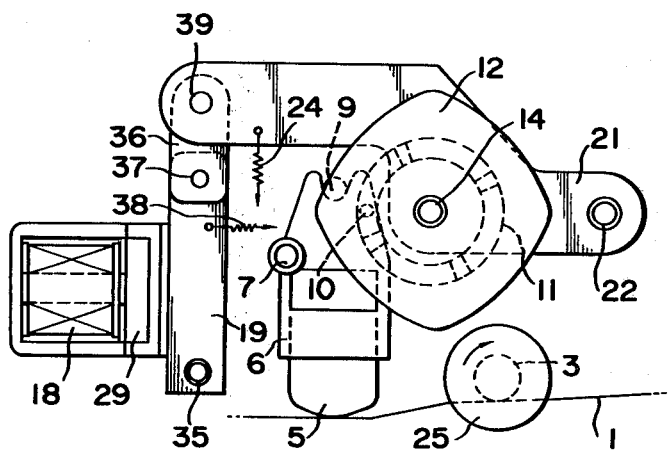
FIG. 8 is a plan view of a fourth embodiment of mechanism according to the invention.

In the embodiment of FIG. 8, the actuator 19 is pivoted at one end upon a rod 35 mounted on the chassis and at its other end is connected to one end of an auxiliary actuator 36 by a pivot pin 37. The actuator 19 is biased by a light spring 38, away from the electromagnet 18 (that is, to the right in the figure). This spring 38 may, however, be omitted if a sufficiently large magnetic repulsion can be produced between the electromagnet 18 and a permanent magnet 29. The other end of the auxiliary actuator 36 is pivoted by a pin 39 to one end of the lever 21 which is elastically biased by a spring 24 so as to push the idler 12, which has generally quadrilateral periphery similar to that of the idler in FIG. 2, toward the drive wheel 25.

In operation, when the electromagnet 18 is energised, the actuator 19 together with the permanent magnet 29 is separated from the electromagnet 18 by the repulsive force and is displaced clockwise. As a result and because the auxiliary actuator 36 is connected to the lever 21, the actuators 19 and 36 take up such a relative angular position that the distance between the pin 39 and the support rod 35 is reduced, and the idler 12 is brought into driving contact with the drive wheel 25 by the springs 24 and 38. The lever 21 is displaced about the rod 22 in accordance with the non-linear angular displacement of the idler 12, and when the centre distance of the drive wheel 25 and idler 12 has a maximum value, the axes of the rod 35 and the pins 39 and 37 come into alignment, and the permanent magnet 29 attaches to the open ends of a U-shaped member of the electromagnet 18 to close the magnetic circuit. At this time, slight angling of the two actuators 19 and 36 is helpful to ensure retention of the permanent magnet 29 on the electromagnet 18. Thus, the idler 12 rotates through 90° and then stops. No further rotation takes place until the electromagnet 18 is energised once again.

As will be understood from the above, the operation of the driving mechanism for the idler 12 relies mainly upon angular displacement about an axis and as such, sliding friction is very small, so that highly reliable operation can be obtained. The electromagnet used in the apparatus may be of small size and of small output.

In the embodiments shown in FIGS. 5 to 8, the electromagnet 18 is energised by direct current pulses produced, for example, by means of a sensing conductor carried on the magnetic tape, or by using a push-button switch for track change overs and a parallel connected resistor and capacitor connected in series with the switch. One step shift of the magnetic head or one track change over can be achieved for each pulse. When desired, the magnetic head can be moved through a plurality of steps by holding the switch button down for a desired period of time.

If the head is to be shifted only one step each time the push-button switch is pressed, a ratchet mechanism is attached to the push-button switch. An embodiment of push-button switch means having a ratchet mechanism will now be explained with reference to FIGS. 9 to 11.

A resilient contact 53 is fixed to one end of a lever 52 which passes through the wall of a chassis 55, and the other end of the lever 55 is fixedly embedded in a push-button 50. Two circlips 54A and 54B are fitted on the lever 52 to limit movement in the axial direction. Between the outer face of the chassis 55 and the circlip 54B is a compression spring 51 biasing the push-button 50 away from the chassis 55. Under a ratchet 57, rotatably supported by a rod 56 mounted on the upper wall of the chassis 55, is a spring 59 biasing the lower face of the ratchet upwardly. In an area 60 of the lower face of the ratchet 57, contacted by the spring 57, are depressions and when the push-button 50 is in the position shown, the spring 59 engages with one of the depressions. At the same time, the outer end of the contact 53 engages with one of the teeth of the ratchet 57. One or a plurality of elastic brushes or contact members 58 are fixed to the upper face of the ratchet 57. In this embodiment, there are two brushes which are symmetrical with respect to the rod 56 for the purpose of mechanical balance. The brush 58 contacts the conductors 61 and 62 (shown in FIG. 11) of which conductor 61 is shaped so as to always to contact the brush 58 and conductor 62 is shaped so that it contacts the brush 58 at 90° intervals (with respect to rotation of the ratchet 57). When the conductor 62 contacts the brush 58, the two conductors 62 and 63 are short-circuited, electric current is supplied to the electromagnet 18 (FIGS. 5, 7 and 8) and the magnetic head is shifted to initiate the track change over. Each of the contact portions 63 of the conductor 62, through which contact is made with the brush 58, is narrow so that the contact time during the rotation of the ratchet 57 is short. When the push-button 50 is in the position shown, the contact portion of the brush 58 is separate from the conductors 61 and 62 as shown in FIG. 11. Accordingly, a pulsed signal is supplied to the electromagnet 18 regardless of the time for which the push-button 50 is depressed, and only one step shift of the magnetic head or one track change over is carried out each time the button is pressed. Since the cam 8 has notches 33 corresponding to the steps of the step cam 11 (as shown in FIG. 5 and 7) or since the idler 12 has a generally quadrilateral shape (as shown in FIGS. 2 and 8), the step cam 11 is displaced in a stepwise fashion, and the tracks are changed one by one.

Each apparatus of the embodiments described above is driven by a capstan, and accordingly, requires relatively little electric power so that erroneous operation which sometimes occurs with the conventional apparatus, is avoided.

The embodiments described above are for four-shift changes, the magnetic head being shifted in four steps. The present invention, however, can be applied to track change-over mechanisms for any number (n) of channels by suitably designing the rotating step cam and other associated parts. With respect to the step cam, for example, the cam has n steps angularly spaced at 360°/n.

What we claim is:

1. A track change-over apparatus for shifting a cam follower (10) of a magnetic head (5) in a multichannel tape recorder including a rotary capstan (3, 25) for driving a tape (1), at least one magnetic head (5) adapted to act on the tape and a rotating stepped cam (11) with n cam steps angularly arranged with space angle of 360°/n (wherein n is the number of channels of track on the tape) for steppingly shifting the magnetic head through the cam follower (10) affixed to the magnetic head, said cam follower (10) abutting against the steps of said rotating stepped cam, comprising:
  a. pivotally supported lever means (21) with a free end;
  b. an idler (12) rotatably supported on a said lever free end for engagement with said capstan (3, 25);
  c. a second rotating cam (8) having n notches (33) arranged on its periphery at intervals of an angle of 360°/n and rotatable about its axis coaxially and synchronously with said idler;
  d. spring means (34) for biasing said idler so that said idler moves away from said capstan (3, 25);
  e. an actuator (19) having one end pivotally supported and a free end for engaging with said second rotating cam (8);
  f. a solenoid-operated electromagnet (18) disposed for pressing the free end of the actuator (19) against the second rotating cam (8) when the electromagnet is energized by an electrical pulse; and
  g. a restraining member (27, 41) mounted disposed for restraining the retreat of the free end of said actuator which takes place when the free end is in engagement with the outer periphery portion except the notches of said second rotating cam so as to effect the contact of said idler with said capstan, whereby, when said electromagnet is energized, said idler is pressed against the capstan through the engagement of the free end of the actuator with the notch of the second rotating cam and is rotatively driven by the capstan through the contact of the free end of the actuator with the outer periphery portion except the notches of said second rotating cam until the free end engages the next notch of the second cam to thereby displace the stepped cam through the space angle of 360°/n for shifting the magnetic head by one step.

2. An appartus as set forth in claim 1 wherein said restraining member consists of an elastic member (27) by which the solenoid-operated electromagnet is mounted on the body of the apparatus.

3. An apparatus as set forth in claim 1 wherein said restraining member consists of a stop (41) mounted on the body of the apparatus so as to limit movement of the actuator.

4. An apparatus as set forth in claim 1, further comprising an abutment (17) fixed to the body of the apparatus for balancing the pressure of the follower on the stepped cam to prevent tilting of the cam, which abutment is substantially aligned with the follower and bearing against a supporting surface opposite to the stepped surface of the cam.

5. An apparatus as set forth in claim 1, further comprising an abutment (17a) fixed to the body of the apparatus, which abutment is bearing against a surface of the lever on which the stepped cam is mounted so as to oppose the pressure of the follower on the stepped cam.

6. An apparatus as set forth in claim 1, further comprising a ratchet (57) associated with a push-button (50) with clicks, and being steppingly rotated 360°/n at a time by one thrust of a click (53) secured to said push-button, and an electric contact (58) for producing an electrical pulse corresponding to the stepping rotation of said ratchet, whereby one step shift of the magnetic head is carried out by one pressing of said push-button.

7. A track change-over apparatus for shifting a cam follower (10) of a magnetic head (5) in a multi-channel tape recorder including a rotary capstan (3, 25) for driving a tape, at least one magnetic head (5) adapted to act on the tape (1) and a rotating stepped cam (11) with n cam steps angularly arranged with space angle of 360°/n (wherein n is the number of channels of track on the tape) for steppingly sitting the magnetic head through the cam follower fixed thereto which abuts against the steps of said rotating stepped cam, comprising:
  a. pivotally supported lever means (21) with a free end;
  b. an idler rotatably supported on a portion of the lever, said idler having on its periphery a plurality of cam portions each having a space angle of 360°/n and with a shorter and longer radius portions and arranged symmetrically with respect to the axis of said idler;
  c. spring means (24) attached to said lever for elastically biasing said idler in a direction such that said idler is pushed to contact with the capstan;
  d. first and second actuator (19, 36) pivotally connected to each other, the first actuator being pivotally connected to a free end of said lever and the second actuator pivotally mounted to the apparatus; and
  e. a solenoid-operated electromagnet (18) mounted disposed for allowing the actuators to move when the electromagnet is energized by an electrical pulse; whereby, when said electromagnet is energized, said idler is pressed against the capstan through the engagement of the shorter-radius cam portion of the idler with the capstan and is driven by the capstan through the contact of the longer-radius cam portion of the idler with the capstan until the capstan engages the next shorter-radius cam portion to thereby displace the stepped cam through the space angle of 360°/n for shifting the magnetic head by one step.

8. An apparatus as set forth in claim 7, further comprising an abutment (17) fixed to the body of the apparatus for balancing the pressure of the follower on the stepped cam to prevent tilting of the cam, which abutment is substantially aligned with the follower and bearing against a supporting surface opposite to the stepped surface of the cam.

9. An apparatus as set forth in claim 7, further comprising an abutment (17a) fixed to the body of the apparatus, which abutment is bearing against a surface of the lever on which the stepped cam is mounted so as to oppose the pressure of the follower on the stepped cam.

10. An apparatus as set forth in claim 7, further comprising a ratchet (57) associated with a push-button (50) having clicks and being steppingly rotated 360°/n at a time by one thrust of a click (53) secured to said push-button, and electric contact means (58) for producing an electrical pulse corresponding to the stepping rotation of said ratchet, whereby one step shift of the magnetic head is carried out by one pressing of said push-button.

* * * * *